US006442634B2

(12) United States Patent
Bronson et al.

(10) Patent No.: US 6,442,634 B2
(45) Date of Patent: Aug. 27, 2002

(54) SYSTEM AND METHOD FOR INTERRUPT COMMAND QUEUING AND ORDERING

(75) Inventors: Timothy C. Bronson, Vestal; Wai Ling Lee, Owego; Vincent P. Zeyak, Jr., Apalachin, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/860,309

(22) Filed: May 18, 2001

Related U.S. Application Data

(62) Division of application No. 09/562,274, filed on Apr. 29, 2000, now Pat. No. 6,279,064, which is a division of application No. 09/144,580, filed on Aug. 31, 1998, now Pat. No. 6,065,088.

(51) Int. Cl.[7] .............................................. G06F 13/00
(52) U.S. Cl. ........................ 710/260; 710/261; 710/262; 710/263; 710/112; 710/39
(58) Field of Search ................................ 710/260–269, 710/112, 38, 52–39

(56) References Cited

U.S. PATENT DOCUMENTS

| 4,271,468 | A |   | 6/1981  | Christensen et al. | 364/200 |
| 4,330,857 | A | * | 5/1982  | Alvarez, III et al. | 370/104 |
| 4,488,227 | A |   | 12/1984 | Miu et al. | 364/200 |
| 5,367,689 | A | * | 11/1994 | Mayer et al. | |
| 5,410,710 | A | * | 4/1995  | Saragdhar et al. | 710/266 |
| 5,568,649 | A |   | 10/1996 | MacDonald et al. | 395/868 |
| 5,671,446 | A | * | 9/1997  | Rakity et al. | 710/54 |
| 5,675,807 | A | * | 10/1997 | Iswandhi et al. | |
| 5,689,713 | A | * | 11/1997 | Normoyle et al. | |
| 5,692,200 | A | * | 11/1997 | Carlson et al. | 710/262 |
| 5,701,495 | A | * | 12/1997 | Arndt et al. | |
| 5,721,931 | A | * | 2/1998  | Gephardt et al. | |
| 5,771,387 | A | * | 6/1998  | Yuong et al. | 710/260 |
| 5,943,500 | A | * | 8/1999  | Maquire et al. | 710/260 |
| 6,061,757 | A | * | 5/2000  | Arimilli et al. | 710/264 |

OTHER PUBLICATIONS

Bouden, G. et al. *High Speed External interrupt Handler for Real Time System*, IBM Technical Disclosure Bulletin, No. 4b, 9/92, p. 192–195.
Holley, E. L. *Interrupt Driven Task Scheduler for Imbedded Control Systems*, IBM Technical Disclosure Bulletin, No. 10b, 3/92, p. 152–153.
Farrell, J. K. et al. *Hardware Managed Interrupt Status Queue and Manual Vector Generator for Multiple Channel Communications Controller*, IBM Technical Disclosure Bulletin, 9/91, p. 131–137.
Kampe, M.A. et al. *Off–level Interrupt Handling*, IBM Technical Disclosure Bulletin, No. 9, 2/91, p. 484–485.
Graham, C. S. et al. *Interrupt Driven Queuing for Communication Between Two Processor*, IBM Technical Disclosure Bulletin, 07/86, p. 668–670.
Edel. R. R. *Intelligent Input Output Interrupt Processing*, IBM Technical Disclosure Bulletin, 12/74, p. 1915–1916.
Costain, R. P. et al. *Method for Queue Management*, IBM Technical Disclosure Bulletin, 9/73, p. 1208–1213.

* cited by examiner

Primary Examiner—Ario Etienne
(74) Attorney, Agent, or Firm—Shelley M Beckstrand

(57) ABSTRACT

An input/output bus bridge and command queuing system includes an external interrupt router for receiving interrupt commands from bus unit controllers (BUCs) and responds with end of interrupt (EOI), interrupt return (INR) and interrupt reissue (IRR) commands. The interrupt router includes a first command queue for ordering EOI commands and a second command queue for ordering INR and IRR commands. A first in first out (FIFO) command queue orders bus memory mapped input output (MMIO) commands. The EOI commands are directed from the first command queue to the input of the FIFO command queue. The EOI commands and the MMIO commands are directed from the command queue to an input output bus and the INR and IRR commands are directed from the second command queue to the input output bus. In this way, strict ordering of EOI commands relative to MMIO accesses is maintained while simultaneously allowing INR and IRR commands to bypass enqueued MMIO accesses.

8 Claims, 3 Drawing Sheets

SYSTEM AND METHOD FOR INTERRUPT COMMAND QUEUING AND ORDERING

CROSS REFERENCES TO RELATED APPLICATIONS

This application is a divisional of U.S. patent application Ser. No. 09/562,274 filed Apr. 29, 2000, now U.S. Pat. No. 6,279,064, for System and Method for Loading Commands to a Bus, Directly Loading Selective Commands While Queuing and Strictly Ordering Other Commands, which is a divisional of U.S. patent application Ser. No. 09/144,580 filed Aug. 31, 1998 by T. C. Bronson et al. for System and Method for Interrupt Command Queuing and Ordering, now U.S. Pat. No. 6,065,088.

BACKGROUND OF THE INVENTION

1. Technical Field of the Invention

This invention pertains to an input/output bus bridge and command queuing system. More particularly, it relates to a system for strictly ordering EOI commands relative to MMIO accesses while simultaneously allowing INR and IRR commands to bypass enqueued MMIO accesses

2. Background Art

In a PowerPC computer system which is Common Hardware Reference Platform (CHRP) compliant, the external interrupt router receives interrupt commands from Bus Unit Controllers (BUCs) and responds with commands that include:

End of Interrupt (EOI)
INterrupt Return (INR)
Interrupt Reissue Request (IRR)

The function of the memory mapped I/O (MMIO) command is to send command information to, and retrieve status information from, Bus Unit Controllers and I/O devices. In some low performance devices, MMIO commands may be to transmit program data. The bridge unit responds to an MMIO command by determining the correct target (in the case of the preferred embodiment described hereafter, this is simplified to "on chip" bus), then sending the command to that target. In the case of an MMIO Store command, data must be sent along with the command. In the case of an MMIO Load command, the response data (which arrives from the I/O device in response to the load command) is received by the bridge chip and placed on the system bus for receipt by the original requester.

The function of the Interrupt Return (INR) command is to inform the interrupting unit that its interrupt could not be processed due to a queue full condition. The interrupt routing unit in the bridge chip sends an INR command to an I/O device in response to receiving in interrupt command when the interrupt queues are full (the command returned may be different from the command received if the incoming interrupt has higher priority than one of the enqueued interrupts). Upon receiving an INR command, the interrupting unit (device or Bus Unit Controller) knows that its interrupt was not processed and that it is not allowed to resend the interrupt command until it receives an Interrupt Reissue Requests (IRR) command.

The function of the Interrupt Reissue Requests (IRR) command is to inform the interrupting unit(s) that the queue conditions in the interrupt routing unit (within the bridge chip) have changed and that it (the interrupting unit) should resend any previously returned (via INR command) interrupts. The interrupt routing unit in the bridge chip generates an IRR command anytime an interrupt is ended (anytime an EOI command is generated) and anytime the processing priority is changed (anytime the CPPR is modified by a processor). The IRR command is not targeted to a particular device, but is broadcast to all devices capable of generating an interrupt command.

The function of the End of Interrupt (EOI) command is to inform the interrupting unit that a previously sent interrupt has been received and acted upon by the processor. The interrupt routing unit sends an EOI command to an I/O device or Bus Unit Controller when a processor writes to one of the XIRR's contained within the interrupt routing unit. The processor performs the write operation after processing for an interrupt is complete.

The routing of these response commands and the ordering of their delivery relative to other I/O commands has traditionally required a trade-off between performance and deadlock avoidance. Specifically, if the delivery of the EOI commands is strictly ordered with the delivery of Memory Mapped Input Output (MMIO) accesses, it is possible to eliminate many time consuming MMIO load operations from an operating system's interrupt service routines and thereby significantly improve system performance.

Unfortunately, in a computer containing a hierarchical I/O bus structure implemented with multiple I/O Hub chips and Host Bridge Adapter chips, the strict ordering of all the interrupt response commands (EOI, INR, and IRRs) with MMIO accesses can result in deadlock conditions. Recovery from such deadlocks requires resetting some or all of the computer system hardware and the abandonment or restarting of software tasks in progress.

In prior art I/O Hub and Host Bridge Adapter chips, a mode bit is provided to allow software control of the ordering of all interrupt response commands relative to MMIO accesses. IBM AS/400 computer systems, for example, use these chips and choose strict ordering to improve system performance. Two consequences of this mode of operation are:

1. Software complexity required to detect and reset various deadlock situations.
2. System configurations which under utilize I/O bus bandwidth in an attempt to minimize the probability of deadlock by minimizing I/O traffic.

In another prior art system, the IBM RS/6000 computer system, the same I/O Hub and Host Bridge Adapter chips are used, in this case choosing not to order interrupt response commands (EOI, INR, and IRRs) relative to MMIO accesses. This allows higher bus utilization without the risk of deadlock, but results in reduced system performance resulting from additional MMIO load operations (to remote I/O BUCs) in the I/O interrupt service routines.

It is an object of the invention to provide an improved interrupt router and I/O command queuing mechanism.

It is a further object of the invention to provide an I/O hub chip which allows for ordering selected interrupt response commands to improve performance and priority delivery of other interrupt response commands for deadlock avoidance.

It is a further object of the invention to provide an interrupt router and I/O command queuing mechanism which allows for the elimination of many time consuming MMIO load operations from an operating system's interrupt service routines without the risk of deadlock associated with ordering INR and IRR commands relative to MMIO accesses.

SUMMARY OF THE INVENTION

In accordance with system of the invention, an interrupt queuing system is provided. An interrupt routing unit is responsive to interrupt commands for generating first interrupt response commands and second interrupt response commands. A first command queue strictly orders the first interrupt response commands with memory mapped input output commands for loading to an input output bus. A second command queue loads the second interrupt response commands to the input output bus. Thus, the second interrupt response commands may be loaded to the input output bus irrespective of stalling of said first command queue.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
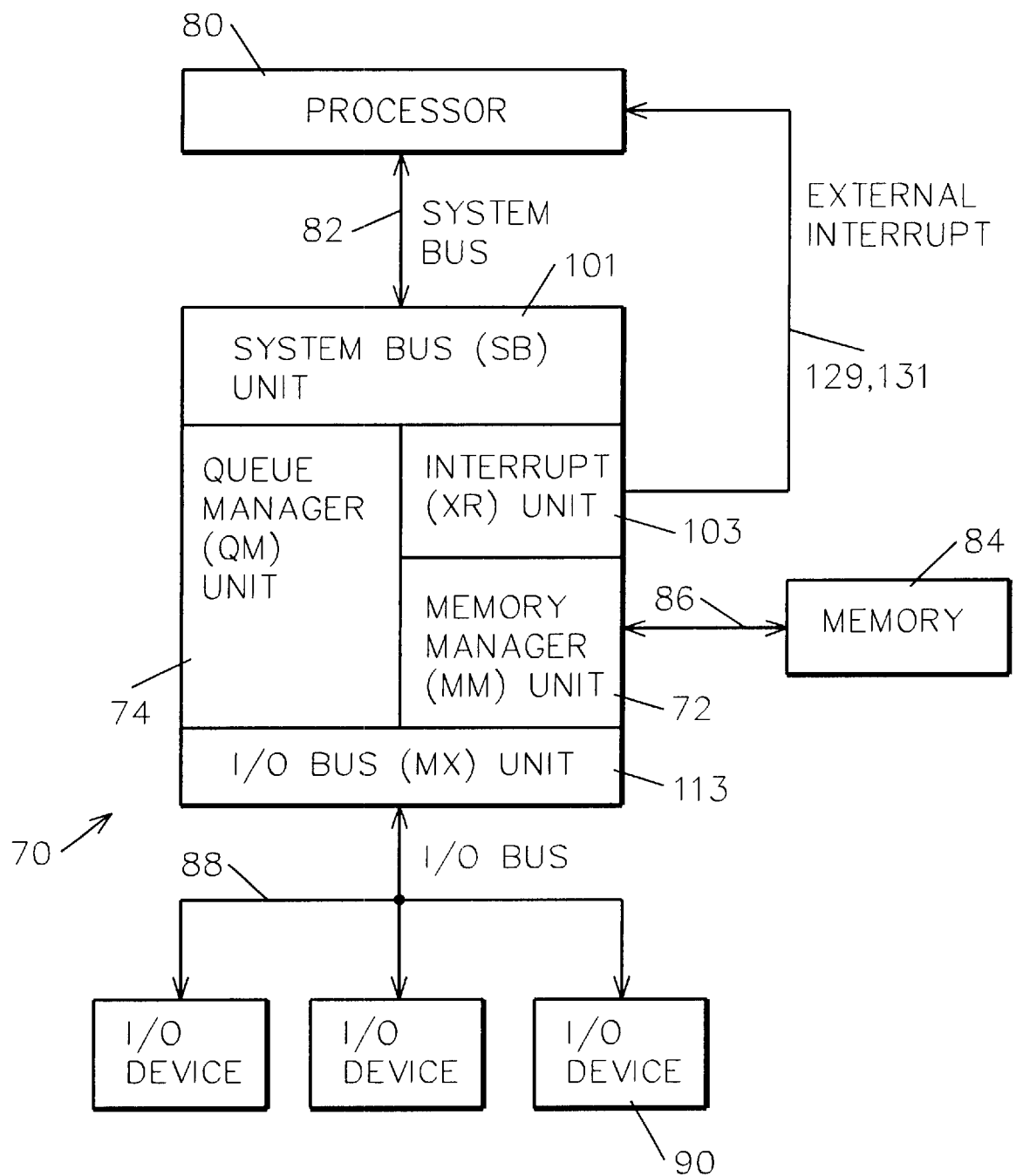
FIG. 1 is a high level system diagram showing the I/O bus bridge and memory controller of the invention.

The preferred embodiment of the invention is implemented within an I/O Bus bridge and Memory Controller chip (controller chip) which processes interrupt commands and controls the discrete interrupt lines to individual processors. Controller chip interrupt logic operates in one of two modes: PowerPC or OpenPIC. The PowerPC mode conforms to the RISC System/6000 PowerPC System Architecture specification 1.39. The OpenPIC mode conforms to the OpenPIC Multiprocessor Interrupt Controller Register Interface Specification Revision 1.2.

The system bus is a high speed bus used to connect multiple processors, I/O hub or I/O bridge chips, and memory controllers. In a high performance computer, the system bus typically consists of a separate address and data bus, as well as dedicated, point-to-point bus arbitration signals. The system bus must support the following functions:

a) Memory access protocol
b) Arbitration protocols
c) Cache coherency protocols
d) Interrupt transfer protocols The memory access protocols provide a means for processors to access memory external to the processor. This memory may reside in system memory attached via a memory controller, or it may be "memory mapped" control/status registers residing in I/O devices attached via the I/O hub or I/O bridge chip(s).

The arbitration protocols provide a means for efficient bus utilization by all the connected units. Ideally, arbitration for the bus occurs "in the background" so that the arbitration is complete and ownership has been determined by the end of the current bus operation.

The cache coherency protocols provide a means for processors to cache frequently used portions of system memory. Accesses to cached data by non-owning units (including I/O) must be controlled so that there is always only one logical image of system memory.

The interrupt transfer protocols provide a means for I/O devices and/or Bus Unit Controllers attached via the I/O hub or I/O bridge chips to interrupt the processors. Interrupt commands use only the address bus portion of the system bus. Information regarding the source, priority, and processor to be interrupted is contained within the interrupt commands.

The controller chip processes and presents interrupts for up to two processors on the same system bus. Interrupt commands originate in I/O BUCs which are connected via an I/O bus. Interrupts which flow across the I/O bus are placed on the system bus for receipt by the controller chip, which then activates interrupts to the target processor. Processor to processor interrupts are also received across the system bus as memory mapped accesses to the appropriate interrupt presentation registers.

In the PowerPC implementation, interrupt logic in the controller chip is an implementation of the interrupt presentation and routing layers described primarily in RISC System/6000 PowerPC System Architecture. In accordance with that architecture, a wide range of implementations is permitted. Some implementation specific features of the controller chip of the preferred embodiment of the invention are: one XIRR per processor; one QIRR per processor; one Global server; queuing for two I/O interrupts per server; static routing of global interrupts to the server operating at the least favored priority (global interrupts are sent to a server queue and remain there until serviced or returned); continuous evaluation of priority of queued interrupts; and one DSIER, updated from snooped PIO replies.

The I/O bus is used to connect multiple Bus Unit Controllers to the I/O hub or I/O bridge chip. The Bus Unit Controllers may be attached directly to the I/O bus or they may be attached indirectly via lower level I/O bridge chips. The I/O bus must perform all the functions listed and described for the system bus with the possible exception of the Cache coherency protocols (depending on whether the system architecture allows for cacheable memory on the I/O bus). Typically the I/O bus is lower performance than the system bus and economies such as common (multiplexed) address and data bus signals are employed.

Referring to FIG. 1, memory controller and I/O bus bridge unit 70 provides within a single chip, a high performance SDRAM controller, an I/O bus interface, and an interrupt controller. It includes the following eight functional units: system bus (SB) unit 101, I/O bus unit 113, queue manager (QM) unit 74, memory manager (MM) 72, interrupt (XR) unit 103, and a clock unit (not shown).

System bus unit 101 is a system bus arbiter which arbitrates use of bus 82, based upon requests it receives from unit 70 and attached processor 80. In a preferred embodiment, system bus 82 is an IBM Server Group MP System Bus Version 5.3. It provides system support functions of unit 70's interface to system bus 82. These functions include bus arbitration, address status and response encoding, data movement functions for processor 80 and snooping functions for I/O bus 88 and processor 80. Requests received from system bus 82 by system bus unit 101 originate either from processor 80 or from bridge unit 70 itself. Requests driven to bus 82 are requests. that were originally captured from I/O bus 88 and are driven to system bus 82 to enforce ordering and coherency between processor 80 and I/O 90. Upon receipt of a non-PIO or non-interrupt request, the system bus unit 101-compares a request's address to the address spaces defined by the address registers within bridge unit 70. Processor I/O (PIO) requests and interrupt commands are always acknowledged by the system bus unit 101 if queue space exists to receive the request. Requests received by SB unit 101 are routed to one of several targets, such as queue manager 74 or interrupt unit 103. Requests received from system bus 82 are destined for either main store 84, I/O 90, interrupt unit 103 or internal register space. System bus unit 101 is synchronous with the bus interface in processor 80 (1:1), and is internal to chip 70.

I/O bus unit 113 is an internal bus arbiter that arbitrates usage of I/O bus 88 for a plurality of I/O chips 90. In addition to these arbitration functions, unit 113 functions include address status encoding, data movement for processor requests that target I/O space, and data movement for I/O requests that target memory 84. Chips 90 supported by a preferred embodiment include an I/O bus to PCI bus bridge, and an I/O bus to System Products Division (SPD) or I/O bus to Application Business System (ABS) bus bridge. I/O bus 88 is asynchronous to system bus 82, and the clock rate of the I/O bus can be equal to or less than that of the system bus 82. I/O bus unit 113 contains two sets of data buffers to hold incoming data: a buffer for DMA stores and a buffer for PIO/MMIO read reply data. DMA store data and PIO/MMIO reply data are transferred across an asynchronous interface to main memory 84 and system bus 82, respectively. In addition, there exists an incoming command queue and three outgoing command queues for similar purposes.

Queue manager 74 controls the flow of requests received from system bus unit 101, I/O bus unit 113, and interrupt unit 103. In accordance with the preferred embodiment of the present invention, the requests which queue manager 74 receives are queued and prioritized before being issued to a target unit. Queue manager 74 receives read and store requests from system bus unit 101, captured from system bus 82, that are destined for main store 84. Memory manager 72 receives requests from queue manager 74 in the order that they are prioritized for execution. Read requests from processor 80 and I/O 90 are maintained in separate queues: a three deep processor read queue and a four deep I/O read queue. Processor and I/O store requests are accumulated in the same queue. This queue holds at most three processor requests and four I/O requests. The order in which requests are stored in the same order that they are read from a queue (FIFO order). Since read requests are assigned a higher priority than store requests, the order in which queue manager 74 receives requests from system bus 82 is not necessarily the same order it issues them to memory manager 72. Requests received from system bus unit 101 are not accepted by queue manager 74 and are retried on system bus 82.

Memory manager 72 interfaces memory 84, the SDRAMs that comprise real system memory. Under the direction of queue manager 74, memory manager 74 performs real memory accesses which honor requests for both the processor 80 and I/O 90. In addition to these requests, memory manager 72 performs main store initialization, main store scrub, ECC generation and checking, and supports continuously powered main store and refresh.

Interrupt unit 103 provides external interrupts to processor 80 over lines 129, 131, and processes either PowerPC or OpenPIC interrupt requests received from I/O 90. Interrupt requests are driven to chip 70 from I/O device 90 via I/O bus 88. Once received by chip 70, these requests are queued and later issued to system bus 82. Interrupt on system bus 82 are captured by system bus unit 101 and issued by it to interrupt unit 103. In response to these requests, interrupt unit 103 activates one of two dedicated interrupt lines 129, 131 to processor 80, or returns the interrupt to I/O device 90. Interrupt requests returned to I/O 90 will be reissued by the I/O device 90 when the interrupt unit 103 sends an interrupt reissue command to I/O bus 88.

The clock unit (not shown) provides the functional and maintenance clocks required by the bridge chip 70.

Figure 2:
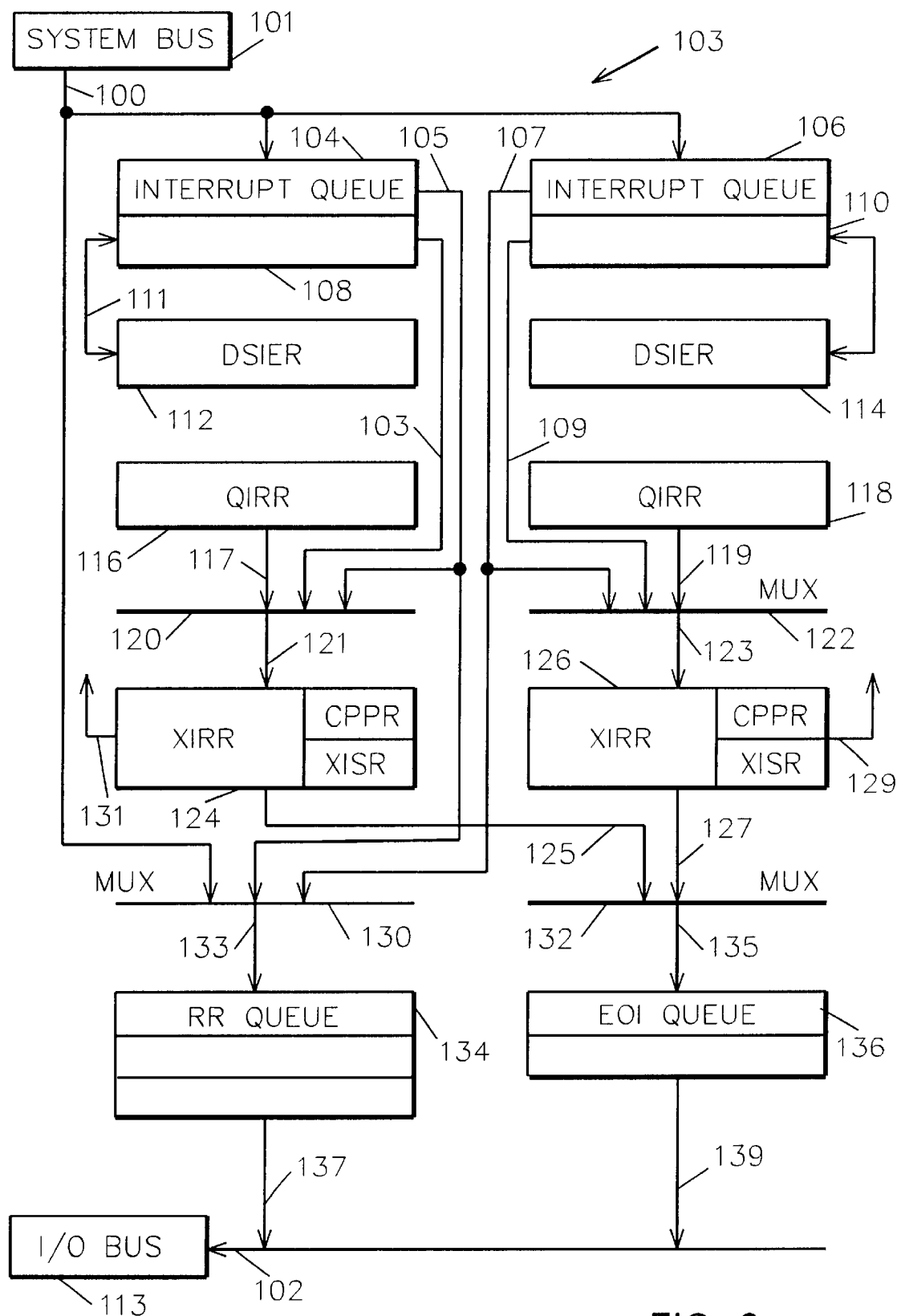
FIG. 2 is a system diagram of the interrupt unit 103 of FIG. 1.

Referring to FIG. 2, the interrupt routing dataflow of the controller chip 103 of the preferred embodiment of the invention will be described.

System bus unit 101 is attached by way of on chip system bus 100 to interrupt queue 104, interrupt queue 106 and multiplexer 130.

Interrupt queue 104 is attached by way of line 111 to DSIER 112, by way of line 103 to multiplexer 120, and by way of line 105 to multiplexers 120 and 130. The other input to multiplexer 120 is from QIRR 116 on line 117. The output of multiplexer 120 is fed on line 121 to XIRR 124, which includes CPPR and XISR. The external interrupt output of XIRR is fed on line 131 to processor 80. Output 125 from XIRR is fed to multiplexer 132, the output of which is fed on line 135 to EOI queue 136 and thence on line 139 to on chip I/O bus 102 and I/O bus unit 113.

Interrupt queue 106 is attached to DSIER 114, by way of line 109 to multiplexer 122 and by way of line 107 to multiplexer 122 and multiplexer 130. The other input to multiplexer 122 is from QIRR 118 on line 119. The output of multiplexer 122 is fed on line 123 to XIRR 126, which includes CPPR and XISR. The output of XIRR 126 is fed on line 127 to multiplexer 132. The output of multiplexer 130 is fed on line 133 to RR queue 134 and thence on line 137 to I/O bus 102.

All interrupts to be processed by controller chip 103 are received from system bus 82. Internal chip system bus interface 101 presents the interrupts received on system bus 82 to the routing layer of the controller chip on bus 100.

Two interrupt queues 104, 106 are provided, one for each possible processor served by controller chip 103. A queue element 104, 106, 108, 110 contains the information associated with an incoming interrupt: Bus Unit Identifier (BUID), level, and priority. A queue element 104, 108 is updated with an incoming interrupt under the following conditions: (1) the interrupt received on bus 100 is targeted for the server associated with the queue (in this case, queue 104), and (2) the queue element 104 or 108 isn't already marked full, or if both queue elements 104, 108 of the target server are full, the priority of the incoming interrupt is compared to the priority of each queue element. If the incoming interrupt has a higher priority (more favored) than one of the queue elements 104 or 108, then that queue element is updated with the incoming interrupt and the previous contents of the queue element are placed via lines 105, 133 and multiplexer 130 on the Rtn/Reissue queue 134, otherwise the incoming interrupt on bus 100 is placed via multiplexer 130 and line 133 on the Rtn/Reissue queue 134.

A queue element 104, 108 is marked full when it is updated with an interrupt. A queue element 104, 108 is marked empty (not full) when the interrupt contained in that queue element is taken by processor 80; this is done by issuing a load of length 4 to XIRR 124 and the interrupt queue multiplexer 120 is switched to that element 104 or 108. Global interrupts are pre-processed and targeted to a specific server, taking into account Global Queue Interrupt Routing Mask ($G_{13}QIRM$), queue space, and server priority. After this pre-processing, a global interrupt is treated as a server specific interrupt.

There are two queued interrupt request registers (QIRR) 116, 118 - one for each possible processor served by controller chip 103. Each QIRR can be written to by software as a means of initiating a processor-to-processor interrupt. The QIRR contains interrupt priority and source information. The priority field is also used to validate, with a priority of 'FF'x indicating that there is not a valid interrupt in the QIRR. When QIRR 116, 118 contains a valid interrupt it competes with the other inputs to interrupt queue MUX 120, 122, respectively, for presentation to XIRR 124, 126 on lines 121, 123, respectively.

There are two external Interrupt Request Registers (XIRR) 124, 126, one for each possible processor served by controller chip 103. Each XIRR includes a Current Processor Priority Register (CPPR) and an external Interrupt Source Register (XISR). Whenever the XISR contains a nonzero value the corresponding external interrupt line 129, 131 is activated. The XISR is updated with the output of the interrupt queue multiplexer 120, 122 whenever the interrupt priority at the output 121, 123 of the Interrupt Queue multiplexer is higher (more favored) than the CPPR. The CPPR is updated with the output 121, 123 of interrupt queue multiplexer 120, 122 whenever a load of length 4 is issued to the XIRR at location BA+4 and the XISR is nonzero (in other words, when an interrupt is taken by the processor.) This causes the CPPR to reflect the priority of the interrupt taken, as required by the PowerPC System Architecture. When an interrupt is taken the XISR is reset to zeros and the corresponding external interrupt line 131, 129 is deactivated. The interrupt line is guaranteed to remain inactive for at least one bus cycle.

There is one Direct Store Interrupt Error Register (DSIER) 112, 114 aliased for each possible processor served by controller chip 103. DSIER is updated from snooped PIO replies.

There are two interrupt queue multiplexers 120, 122, one for each possible processor served by controller chip 103. Each multiplexer 120, 122 has three inputs 117/103/105 and 107, 109, 119, respectively, which can be switched to the multiplexer output 121, 123, respectively. Associated with each input to MUXs 120, 122 is an interrupt priority and a valid or full bit. The multiplexer output 121, 123 is normally switched to the valid input having the highest (most favored) priority. Multiplexer outputs 121, 123 feeds XIRRs 124, 126, respectively, each of which includes a CPPR and an XISR.

Multiplexers 120 and 122 have the same structure and operation. With respect to MUX 120, two of the inputs to come from interrupt queue 104 on lines 103 and 105. Only when a queue element 104, 108 contains a valid interrupt is it a candidate for being switched to multiplexer 120 output 121. Likewise, the input from QIRR 116 on line 117 is considered only when it contains a valid processor-to-processor interrupt. Because it is possible that a change in priority at one of the inputs 117, 103, 105 of interrupt queue multiplexer 120 will cause the multiplexer to switch and result in XIRR 124 being updated while it contains a pending interrupt, the sources of interrupt information (queue elements 105, 108) must retain their contents even when they have been stored in XIRR 124. Only when the interrupt is taken or flushed can the source of interrupt information be marked empty. There is one case in which the output of interrupt queue multiplexer 120 is not switched to the input containing the interrupt with the highest (most favored) priority. This is when the contents of the interrupt queue 104 are being replaced by an incoming interrupt of higher priority, as previously explained.

There is one EOI queue 136 in controller chip 103. All outbound End Of Interrupt (EOI) commands are dispatched through this queue. The output of EOI queue 136 participates in Direct Memory Access (DMA) operations with other output requests in arbitration for the I/O bus through drivers 113.

EOI queue multiplexer 132 switches between two inputs 125, 127, one per server) to gate the appropriate data to the EOI queue 136 on line 135. The sources of data and the conditions for placement on the queue are described in greater detail hereafter.

There is one return/reissue (Rtn/Reissue, or RR) queue 134 in controller chip 103. All output Rtn (Interrupt Return) and Reissue Interrupt commands are dispatched through queue 134. The output 137 of queue 134 participates with DMAs and other outbound requests in arbitration for the I/O bus.

Rtn/Reissue queue MUX 130 switches between inputs 100, 105 and 107 to gate the appropriate data to RR queue 134 on line 133, as will be more fully described hereafter.

In accordance with the preferred embodiment of the invention, to be more fully described hereafter, EOI queue 136 and RR queue 134 are separate to enable ordering of EOI with MMIO operations. Return interrupt commands are not ordered with MMIO operations in order to avoid deadlock conditions. These separate queues 134, 136 provide the structure for prioritizing the propagation of Return/Reissue commands while ordering EOI commands.

Figure 3:
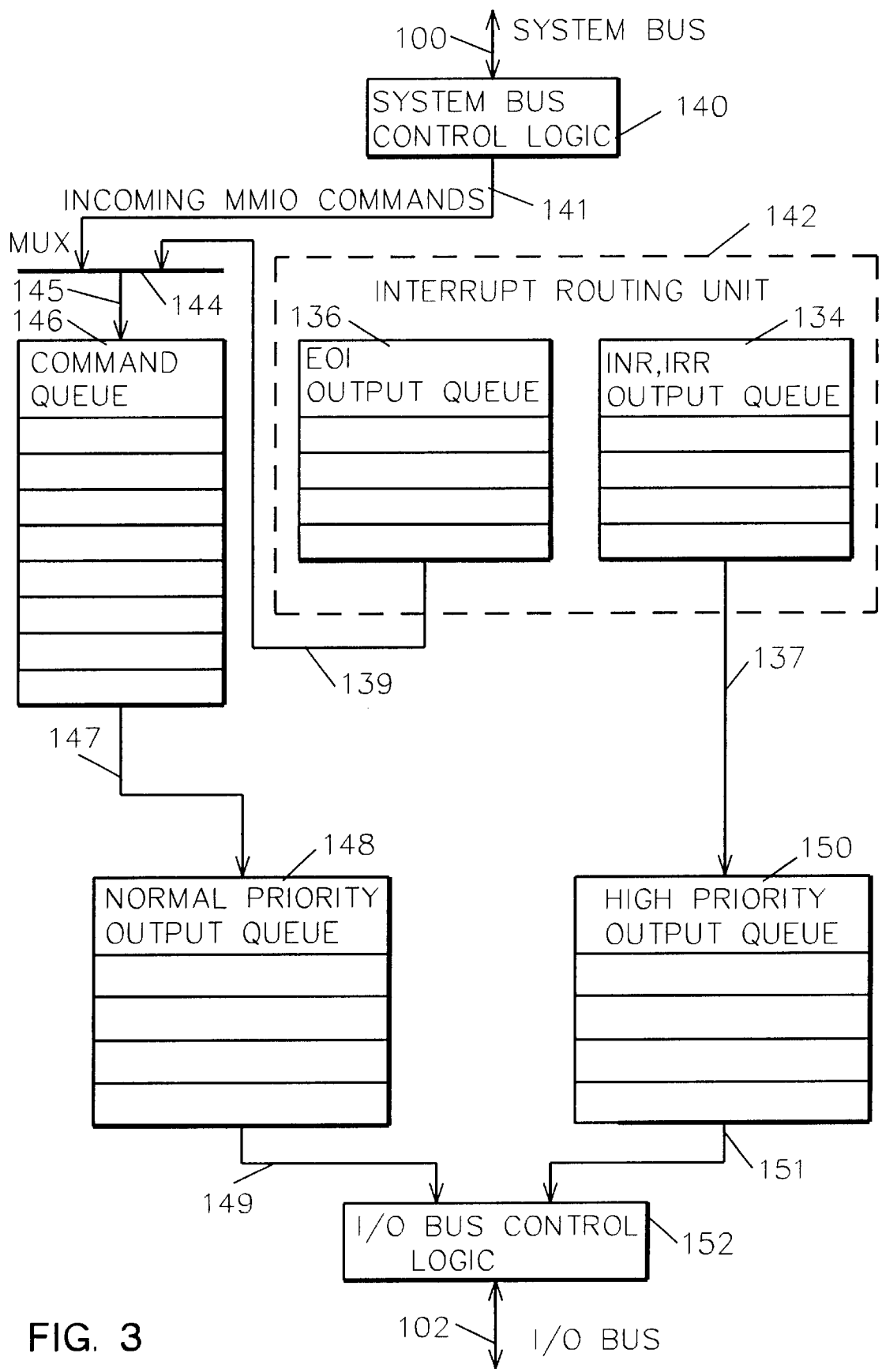
FIG. 3 is a further system diagram of the interrupt unit 103 illustrating, in particular, the structure of the output queues of the preferred embodiment of the invention.

Referring to FIG. 3, in accordance with the preferred embodiment of the invention, an interrupt router and I/O command queuing system and method is implemented in an I/O Bus bridge and Memory Controller chip (hereafter sometimes referred to as a controller chip) 103 which enforces strict ordering of EOI commands relative to MMIO accesses while simultaneously allowing INR and IRR commands to bypass enqueued MMIO accesses. This capability allows for the elimination of many time consuming MMIO load operations from an operating systems interrupt service routines without the risk of deadlock associated with ordering INR and IRR commands relative to MMIO accesses.

The interrupt router 142 within interrupt unit 103 has two separate output command queues, queue 136 for EOI commands and queue 134 for both INR and IRR commands. The outputs of these queues 134, 136 are inserted into the overall I/O command flow at different points in the chip. The output of EOI queue 136 is fed on line 139 to multiplexer 144, the other input to which is fed on incoming MMIO commands line 141 from system bus 100 via control logic 140. The output 137 of queue 134 is fed to high priority output queue 150 and thence on line 151 to I/O bus control logic 152 and I/O bus 102. The output of command queue 146 is fed on line 147 to normal priority output queue 148 and thence on line 149 to bus control logic 152 and I/O bus 102.

In operation, EOI commands leaving interrupt router 142 are inserted at the beginning of the I/O command queue 146 which is implemented as a strict First In First Out (FIFO) queue. Consequently, I/O interrupt service routines can be assured that any MMIO accesses issued on line 141 prior to EOI generation on line 139 will reach the target bus unit controller (BUC) before the EOI. It is then unnecessary to follow store commands with load (read) commands to assure execution of the store prior to issuing an EOI.

INR and IRR commands leaving the interrupt router on line 137 are delivered to high priority I/O command queue 150. The commands in this queue 150 are considered separately from the normal priority command queue 148 for output onto the I/O bus 102. If the normal priority command queue 148 is stalled because of busy conditions at an I/O destination, high priority queue 150 is still serviced and commands can continue to be drained out onto I/O bus 102. This implementation effectively allows INR and IRR commands to pass MMIO accesses and eliminates the deadlocks that can arise when I/O devices have MMIO queue full conditions pending the re-enabling of interrupt processing (waiting for INR or IRR).

Advantages over the Prior Art

It is advantage of the system and method of the preferred embodiment of this invention that there is provided an improved interrupt router and I/O command queuing mechanism.

It is a further advantage of the invention that there is provided an I/O hub chip which allows for ordering selected interrupt response commands to improve performance and priority delivery of other interrupt response commands for deadlock avoidance.

It is a further advantage of the invention that there is provided an interrupt router and I/O command queuing mechanism which allows for the elimination of many time consuming MMIO load operations from an operating system's interrupt service routines without the risk of deadlock associated with ordering INR and IRR commands relative to MMIO accesses.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. An interrupt routing method, comprising the steps of:
selectively responsive to an interrupt command from a first interrupting device presenting said interrupt command to a first processor and activating a first interrupt state;
responsive to said interrupt command being received while said first interrupt state is active, selectively queuing said interrupt command or issuing an interrupt return command rejecting said interrupt command and inhibiting further interrupt requests pending issuance of an interrupt reissue request (IRR) command;
responsive to a load command while said first interrupt state is active, deactivating said first interrupt state; and
responsive to a store command generating an ordered end of interrupt (EOI) command and broadcasting an unordered reissue request (RR) command to all devices thereby inviting interrupting devices to submit interrupt request commands.

2. A program storage device readable by a machine, tangibly embodying a program of instructions executable by a machine to perform method steps for routing interrupts, said method steps comprising:
selectively responsive to an interrupt command from a first interrupting device presenting said interrupt command to a first processor and activating a first interrupt state;
responsive to said interrupt command being received while said first interrupt state is active, selectively queuing said interrupt command or issuing an interrupt return command rejecting said interrupt command and inhibiting further interrupt requests pending issuance of an interrupt reissue request (IRR) command;
responsive to a load command while said first interrupt state is active, deactivating said first interrupt state; and
responsive to a store command generating an ordered end of interrupt (EOI) command and broadcasting an unordered reissue request (RR) command to all devices thereby inviting interrupting devices to submit interrupt request commands.

3. An interrupt unit for providing external interrupts to a processor and processing interrupt requests received from an I/O device, comprising:
an interrupt router including a first output command queue for queuing EOI commands and a second output command queue for queuing both INR and IRR commands;
said interrupt unit being selectively operable responsive to an interrupt command having an effective priority level from a first interrupting device while an effective priority state unit is in a second priority level for presenting said interrupt command at a system bus connection to a first processor and activating an interrupt state unit; responsive to said interrupt command of a first priority level less than the priority level of said effective priority state unit being received while a first interrupt state is active, selectively queuing said interrupt command to an interrupt queue or, if said interrupt queue is full, issuing an interrupt return command to a reissue request queue rejecting said interrupt command and inhibiting further interrupt requests pending issuance of an interrupt reissue request (IRR) command.

4. The interrupt unit of claim 3, said interrupt unit being further selectively operable responsive to a load command at said system bus connection while said first interrupt state unit is active for deactivating said interrupt state unit and raising the priority level of said effective priority state unit; and operable responsive to a store command at said system bus connection for generating an ordered end of interrupt (EOI) command to said end of interrupt queue, and broadcasting an unordered reissue request (RR) command to said reissue request queue and lowering the priority level of said effective priority state unit.

5. An interrupt routing unit, comprising:
an interrupt unit interconnecting at least one input/output (I/O) device and a plurality of processors;
a queue;
said interrupt unit being selectively operable responsive to an interrupt command having an effective priority level from a first interrupting device while said interrupt unit is in a second priority level for (1) presenting said interrupt command to a first processor and activating a first interrupt state; responsive to said interrupt command of a first priority level less than said effective priority level being received while said first interrupt state is active, selectively (2) queuing said interrupt command to said queue or, if said queue is full, (3) issuing an interrupt return command rejecting said interrupt command and inhibiting further interrupt requests pending issuance of an interrupt reissue request (IRR) command;
said interrupt unit being selectively operable responsive to a load command from said first processor while said first interrupt state is active for (1) deactivating said first interrupt state and (2) raising said effective priority level; and
said interrupt unit being operable responsive to a store command from said first processor for (1) generating an ordered end of interrupt (EOI) command to said first interrupting device, and (2) broadcasting an unordered reissue request (RR) command to all devices and lowering said effective priority level thereby inviting interrupting devices to submit interrupt request commands.

6. An interrupt router, comprising:

a system bus connection;

an input/output bus connection;

an interrupt queue;

an effective priority state unit;

an interrupt state unit;

a reissue request queue;

an end of interrupt queue;

an interrupt unit selectively operable responsive to an interrupt command having an effective priority level from a first interrupting device while said effective priority state unit is in a second priority level for (1) presenting said interrupt command at said system bus connection to a first processor and activating said interrupt state unit; responsive to said interrupt command of a first priority level less than the priority level of said effective priority state unit being received while said first interrupt state is active, selectively (2) queuing said interrupt command to said interrupt queue or, if said interrupt queue is full, (3) issuing an interrupt return command to said reissue request queue rejecting said interrupt command and inhibiting further interrupt requests pending issuance of an interrupt reissue request (IRR) command;

said interrupt unit being selectively operable responsive to a load command at said system bus connection while said first interrupt state unit is active for (1) deactivating said interrupt state unit and (2) raising the priority level of said effective priority state unit; and said interrupt unit being operable responsive to a store command at said system bus connection for (1) generating an ordered end of interrupt (EOI) command to said end of interrupt queue, and (2) broadcasting an unordered reissue request (RR) command to said reissue request queue and lowering the priority level of said effective priority state unit.

7. An interrupt routing method, comprising the steps of:

selectively responsive to an interrupt command having a priority level higher than an effective priority level from a first interrupting device presenting said interrupt command to a first processor and activating a first interrupt state;

responsive to said interrupt command being received while said first interrupt state is active, selectively queuing said interrupt command or issuing an interrupt return command rejecting said interrupt command and inhibiting further interrupt requests pending issuance of an interrupt reissue request (IRR) command;

responsive to a load command while said first interrupt state is active, deactivating said first interrupt state and raising said effective priority level; and responsive to a store command generating an ordered end of interrupt (EOI) command and broadcasting an unordered reissue request (RR) command to all devices and lowering said effective priority level thereby inviting interrupting devices to submit interrupt request commands.

8. An article of manufacture comprising:

a computer useable medium having computer readable program code means embodied therein for routing interrupt commands, the computer readable program means in said article of manufacture comprising:

computer readable code means for causing a computer to effect selectively responsive to an interrupt command having a priority level higher than an effective priority level from a first interrupting device presenting said interrupt command to a first processor and activating a first interrupt state;

computer readable code means for causing a computer to effect responsive to said interrupt command being received while said first interrupt state is active, selectively queuing said interrupt command or issuing an interrupt return command rejecting said interrupt command and inhibiting further interrupt requests pending issuance of an interrupt reissue request (IRR) command;

computer readable code means for causing a computer to effect responsive to a load command while said first interrupt state is active, deactivating said first interrupt state and raising said effective priority level; and computer readable code means for causing a computer to effect responsive to a store command generating an ordered end of interrupt (EOI) command and broadcasting an unordered reissue request (RR) command to all devices and lowering said effective priority level thereby inviting interrupting devices to submit interrupt request commands.

* * * * *